US012259463B2

(12) United States Patent
Tapia

(10) Patent No.: US 12,259,463 B2
(45) Date of Patent: Mar. 25, 2025

(54) SYSTEMS AND METHODS FOR USING COMPUTER VISION TO GUIDE PROCESSING OF RECEIVE RESPONSES OF RADAR SENSORS OF A VEHICLE

(71) Applicant: GM CRUISE HOLDINGS LLC, San Francisco, CA (US)

(72) Inventor: Daniel Flores Tapia, Fairfield, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 373 days.

(21) Appl. No.: 17/945,845

(22) Filed: Sep. 15, 2022

(65) Prior Publication Data

US 2024/0094382 A1 Mar. 21, 2024

(51) Int. Cl.
*G01S 13/86* (2006.01)
*G01S 7/292* (2006.01)
*G01S 7/35* (2006.01)
*G01S 13/931* (2020.01)

(52) U.S. Cl.
CPC ............ *G01S 13/867* (2013.01); *G01S 7/292* (2013.01); *G01S 7/354* (2013.01); *G01S 13/931* (2013.01)

(58) Field of Classification Search
None
See application file for complete search history.

(56) References Cited

U.S. PATENT DOCUMENTS

| 10,451,712 | B1* | 10/2019 | Madhow | G01S 13/723 |
| 11,231,489 | B2* | 1/2022 | Viswanatha | G01S 7/4915 |
| 2017/0242117 | A1* | 8/2017 | Izzat | G01S 17/66 |
| 2022/0021114 | A1* | 1/2022 | Gal | H03F 3/195 |

OTHER PUBLICATIONS

Jeevitha T., "Evaluation of Polyphase Filter Architecture for pulse detection and measurement", International Journal of Engineering Research & Technology, www.ijert.org, 2014, 5 pages.
Nabati, Ramin et al., "CFTrack: Center-based Radar and Camera Fusion for 3D Multi-Object Tracking", Jul. 11, 2021, 6 pages.

* cited by examiner

*Primary Examiner* — Vladimir Magloire
*Assistant Examiner* — David C. Schultz

(57) ABSTRACT

For some embodiments of the present disclosure, systems and methods for using computer vision to guide processing of receive responses of RADAR sensors of a vehicle are described. A computer implemented method comprises receiving, with one or more receivers of RADAR sensors, environment receive RF responses, receiving region of interest (ROI) information including segments of a tentative set of ROIs with free space area boundaries from an image processor of an image processing chain for the computer vision, dynamically determining a number of polyphase filters based on a number of ROIs having dynamic scenes that are provided by the image processing chain, and adjusting parameters of the polyphase filters of a RADAR processing chain based on the ROI information.

20 Claims, 8 Drawing Sheets

SYSTEMS AND METHODS FOR USING COMPUTER VISION TO GUIDE PROCESSING OF RECEIVE RESPONSES OF RADAR SENSORS OF A VEHICLE

TECHNICAL FIELD

Embodiments described herein generally relate to the fields of autonomous vehicles and driver assistance vehicles, and more particularly relate to systems and methods for using computer vision to guide processing of receive response of RADAR sensors of a vehicle.

BACKGROUND

Autonomous vehicles, also known as self-driving cars, driverless vehicles, and robotic vehicles, may be vehicles that use multiple sensors to sense the environment and move without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles. Current automotive RADAR sensors when operating in enclosed environments can generate a high number of artifacts limiting their use in such enclosed environments.

SUMMARY

For some embodiments of the present disclosure, systems and methods for using computer vision to guide processing of receive responses of RADAR sensors of a vehicle are described. For some embodiments of the present disclosure, a computer implemented method comprises receiving, with one or more receivers of RADAR sensors, environment receive RF responses, receiving region of interest (ROI) information including segments of a tentative set of ROIs with free space area boundaries from an image processor of an image processing chain for the computer vision, dynamically determining a number of polyphase filters based on a number of ROIs having dynamic scenes that are provided by the image processing chain, and adjusting parameters of the polyphase filters of a RADAR processing chain based on the ROI information.

Other features and advantages of embodiments of the present disclosure will be apparent from the accompanying drawings and from the detailed description that follows below.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION OF EMBODIMENTS

Figure 1A:
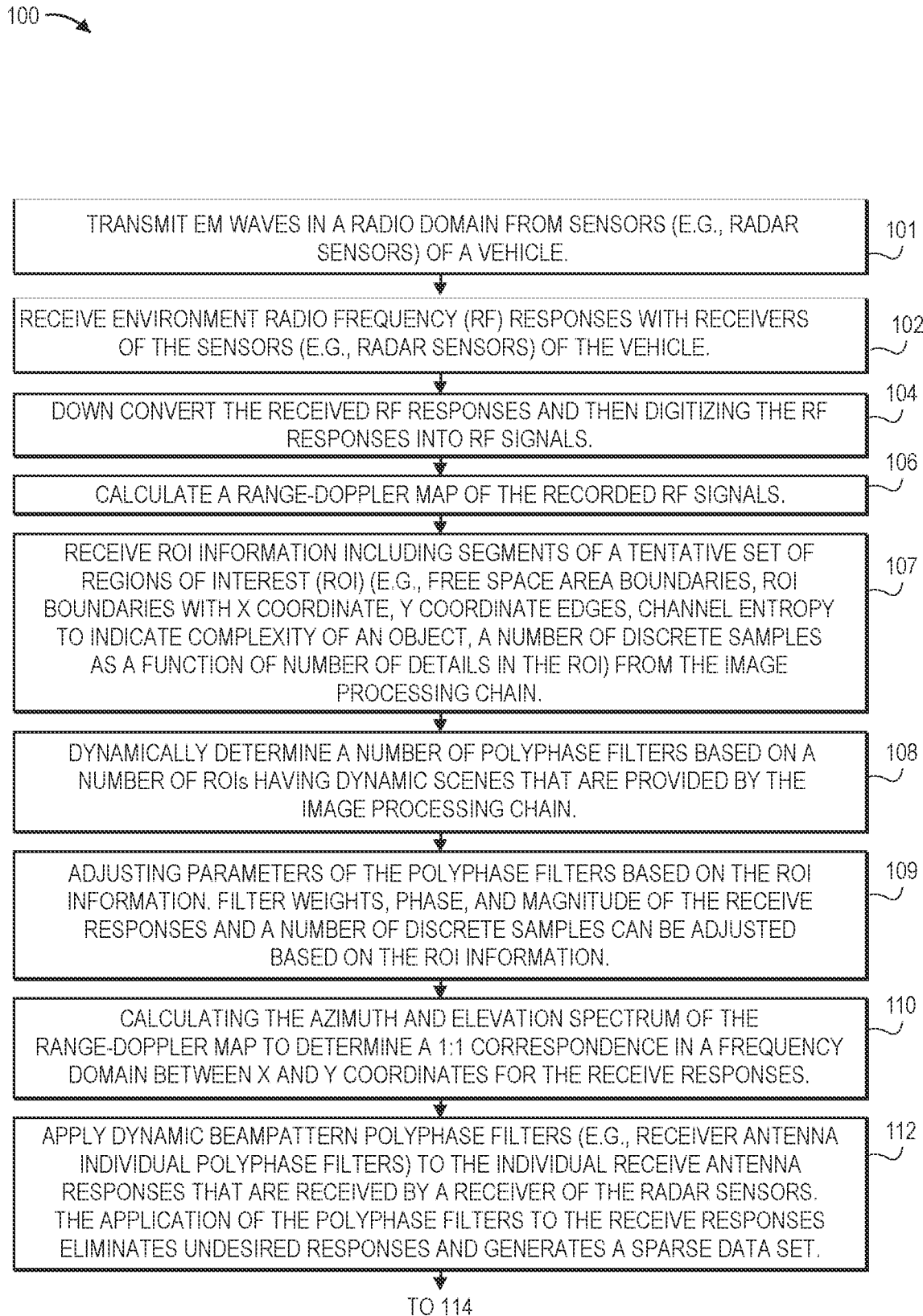
FIGS. 1A and 1B illustrate a computer-implemented method 100 for using computer vision to guide processing of receive responses of RADAR sensors of a vehicle in accordance with some examples of the present disclosure.

Autonomous driving decisions are based on receiving sensed data from sensors of an autonomous vehicle (AV). Current automotive RADAR sensors present significant challenges when operating in enclosed environments, such as the generation of a high number of artifacts and increased levels of environmental clutter, limiting their use in such enclosed environments. Due to the nature of the electromagnetic wave at the frequencies at which automotive RADAR is designated to operate (e.g., 77-81 GHz), the antennas irradiate a wide wavefront. This severely limits the capability of RADAR sensors to filter responses from high reflective structures such as walls and floors. Current RADAR point cloud formation methods have limited ability to discriminate artifacts. This is mostly due to the fact that current RADAR processing chains are designed to operate with little or no prior information, since any sensor fusion with image data is performed at the point cloud level. At that stage, the processing chain is too late to eliminate second order signal propagation effects that usually result in large ghost or artifact responses.

Systems and methods for using computer vision to guide processing of receive responses of RADAR sensors of an autonomous vehicle are described herein. Computer vision is a field of artificial intelligence (AI) that enables computers and systems to derive meaningful information from digital images, videos and other visual inputs and take actions or make recommendations based on that information. A scan on receive design shapes the RADAR antenna receive pattern. This present design provides an adaptive filtering technique to eliminate the receive responses from undesired highly reflective structures. A novel camera processing chain and novel scan on receive processes eliminate responses from undesired highly reflective targets. This results in increased sensitivity and specificity of high resolution RADAR used in vehicles and AVs.

The present design provides Physics based signal enhancement. Since the processing of the receive responses are performed by adaptively attenuating the undesired structure responses, the potential that the target of interest responses are compromised is drastically reduced. This is considerably different to the typical RADAR Camera fusion techniques that rely on artifact elimination on point cloud data, in which the quality of the targets of interest responses may be already compromised due to the roof/wall structure clutter. The present design has adaptive capabilities to detect residual wall/roof structure responses, and using such information to further refine the scan on receive responses to further attenuate the responses from the undesired structures. Due to the use of camera information, the scan on receive beampattern filters can be determined in a single data collection cycle, which will result in less than one cycle delay on delivering a high quality point cloud.

Unlike typical RADAR Camera fusion techniques, the methods of the present disclosure are performed at the lowest possible signal level, full waveform, during the RADAR processing chain instead of at the full point cloud level. These methods are based on the use of polyphase filters during the RADAR processing chain to provide a compact and robust filter architecture to generate highly dynamic beampattern filter structures to eliminate the effects of undesired structures in the receive signals.

In the following description, for purposes of explanation, numerous specific details are set forth in order to provide a thorough understanding of the present disclosure. It will be apparent, however, to one skilled in the art that the present disclosure can be practiced without these specific details. In other instances, well-known structures and devices are shown in block diagram form in order to avoid obscuring the present disclosure.

Reference in the specification to "one embodiment" or "an embodiment" means that a particular feature, structure or characteristic described in connection with the embodiment is included in at least one embodiment of the present disclosure. Thus, the appearances of the phrase "in one embodiment" appearing in various places throughout the specification are not necessarily all referring to the same embodiment. Likewise, the appearances of the phrase "in another embodiment," or "in an alternate embodiment" appearing in various places throughout the specification are not all necessarily all referring to the same embodiment.

Figure 1B:
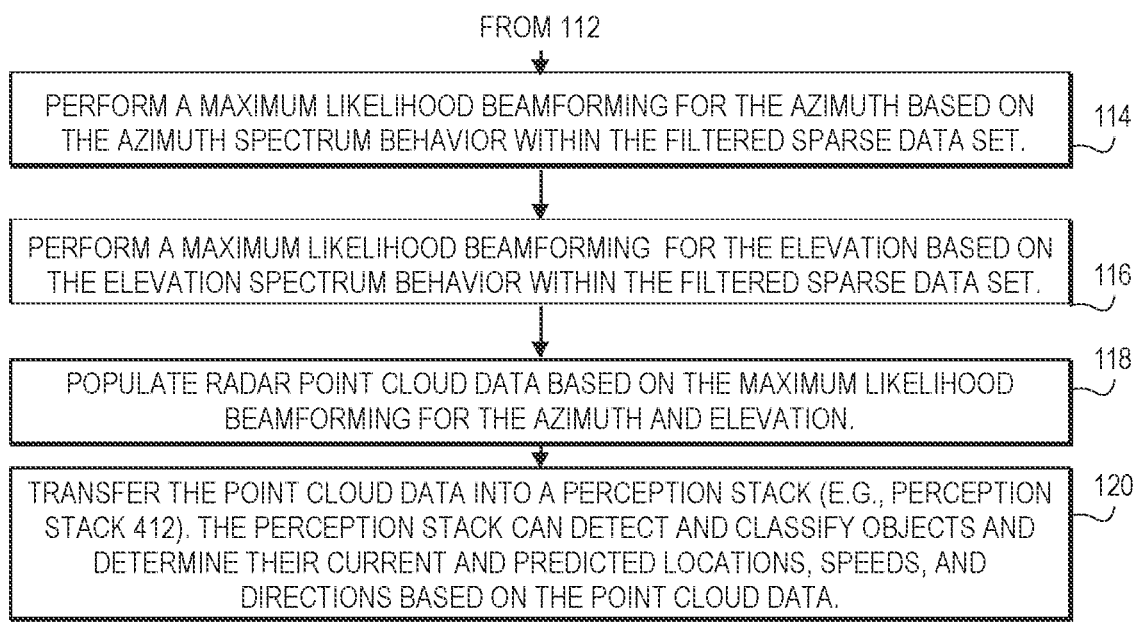

FIGS. 1A and 1B illustrate a computer-implemented method 100 for using computer vision to guide processing of receive responses of RADAR sensors of a vehicle in accordance with some examples of the present disclosure.

This computer-implemented method 100 can be performed by processing logic of a computing system that may comprise hardware (circuitry, dedicated logic, a processor, etc.), software (e.g., planning software, planning layer, or planning solver run on a general purpose computer system or a dedicated machine or a device), or a combination of both. The operations of method 100 can be performed by a RADAR processing chain 210, an image processing chain 240, a local computing device 410 or remoting data center 450 of FIG. 4, the processor 610 of FIG. 6, or the system 1202 of FIG. 7.

At operation 101, the computer-implemented method includes transmitting electromagnetic (EM) waves in a radio domain of a driving environment from sensors (e.g., RADAR sensors) of a vehicle. At operation 102, the computer-implemented method includes receiving environment radio frequency (RF) responses with receivers of the sensors (e.g., RADAR sensors) of the vehicle (e.g., autonomous vehicle with full driving automation (level 5) and no human attention needed, high driving automation (level 4) with no human attention needed in most circumstances, conditional driving automation (level 3) with a human ready to override the AV, partial automation mode (level 2) with the vehicle having automated functions such as acceleration and steering but the driver remains engaged with the driver task and monitors an environment, and driver assistance mode (level 1) with the vehicle controlled by the driver but some driver assist features). The EM waves are transmitted in a driving environment and can be reflected by structures (e.g., partially reflective structures, reflective structures, underpasses, tunnels, parking lots, walls, etc.) of a driving environment of the vehicle and received as RF responses by the receivers of the RADAR sensors.

A RADAR processing chain can receive the environment RF responses. The RADAR processing chain may include one or more processors for the RADAR processing.

At operation 104, the computer-implemented method includes down converting the received RF responses and then digitizing the down converted RF responses into RF signals. At operation 106, the computer-implemented method includes calculating a Range-Doppler map of the recorded RF signals. If a transmitter platform is stationary, a range-Doppler map shows a response from stationary targets or objects at zero Doppler. For targets or objects that are moving relative to the transmitter platform, the range-Doppler map shows a response at nonzero Doppler values.

At operation 107, the computer-implemented method includes receiving ROI information including segments of a tentative set of regions of interest (ROI) (e.g., free space area boundaries, ROI boundaries with x coordinate, y coordinate edges, channel entropy to indicate complexity of an object, a number of discrete samples as a function of number of details in the ROI) from an image processing chain. A number of discrete samples can be adjusted based on a number of details in the ROI. Cameras of the vehicle capture images of the driving environment that are processed by the image processing chain to perform computer vision. The image processing chain may include one or more processors for the image processing and computer vision.

At operation 108, the computer-implemented method includes dynamically determining a number of polyphase filters of the RADAR processing chain based on a number of ROIs having dynamic scenes that are provided by the image processing chain. In one example, a driving environment includes 2 parked cars and 2 pedestrians. In this case, one low entropy ROI is provided for each car and one high entropy ROI is provided for each pedestrian. A polyphase filter is dynamically provided for each ROI.

At operation 109, the computer-implemented method includes adjusting parameters of the polyphase filters of the RADAR processing chain based on the ROI information that is provided by the image processing chain. Filter weights, phase, and magnitude of the receive responses and a number of discrete samples can be adjusted based on the ROI information. For example, a high filter weight is assigned within ROI boundaries while a low filter weight is assigned outside of ROI boundaries. In one example, the receive responses irradiate in a cone pattern with x and y coordinates being unknown.

Polyphase filtering is a multirate signal processing operation that leads to an efficient filtering structure for hardware implementation. Polyphase filtering parallelizes the filtering operation to reduce a computational load on a spectrum estimator. By decimating in a frequency domain, the computational load on the spectrum estimator is greatly reduced.

At operation 110, the computer-implemented method includes calculating the Azimuth and elevation spectrum of the Range-Doppler map to determine a 1:1 correspondence in a frequency domain between x and y coordinates for the receive responses. Azimuth varies from 0° (North) to 360°. Azimuth, elevation, and radius are elements of a spherical coordinate system. The radius or radial distance is the Euclidean distance from an origin O to a point P. The inclination (or polar angle) is the angle between the zenith direction and the line segment OP. The azimuth (or azimuthal angle) is the signed angle measured from the azimuth reference direction to the orthogonal projection of the line segment OP on the reference plane.

The sign of the azimuth is determined by choosing what is a positive sense of turning about the zenith. This choice is arbitrary, and is part of the coordinate system's definition. The elevation angle is 90 degrees ($\pi/2$ radians) minus the inclination angle.

At operation 112, the computer-implemented method includes applying dynamic beampattern polyphase filters (e.g., receiver antenna individual polyphase filters) to the individual receive antenna responses that are received by one or more receivers of the RADAR sensors. The application of the polyphase filters to the receive responses eliminates undesired responses and generates a sparse data set.

At operation 114, the computer-implemented method includes performing a maximum likelihood beamforming for the azimuth based on the azimuth spectrum behavior within the filtered sparse data set. The hypotheses for the maximum likelihood beamforming estimation can be a set of receive responses at a certain angle of arrival. The angle of arrival for the receive response is varied to obtain a maximum likelihood beamforming estimation for the azimuth. Beamforming or spatial filtering is a signal processing technique used in sensor arrays for directional signal transmission or reception. This is achieved by combining elements in an antenna array in such a way that signals at particular angles experience constructive interference while others experience destructive interference.

At operation 116, the computer-implemented method includes performing a maximum likelihood beamforming estimation for the elevation based on the elevation spectrum behavior within the filtered sparse data set. The hypotheses for the maximum likelihood beamforming estimation can be a set of receive responses at a certain angle of arrival. The angle of arrival for the receive response is varied to obtain a maximum likelihood beamforming estimation for the elevation. A point cloud is a set of data points in space. The points may represent a 3D shape or object. Each point position has its set of Cartesian coordinates (X, Y, Z).

At operation 118, the computer-implemented method includes populating RADAR point cloud data based on the maximum likelihood beamforming estimations for the azimuth and elevation.

At operation 120, the computer-implemented method includes transferring the point cloud data into a perception stack (e.g., perception stack 412). The perception stack can detect and classify objects and determine their current and predicted locations, speeds, and directions based on the point cloud data. The perception stack can also identify environmental uncertainties, such as where to look for moving objects, flag areas that may be obscured or blocked from view, and so forth.

Figure 2:
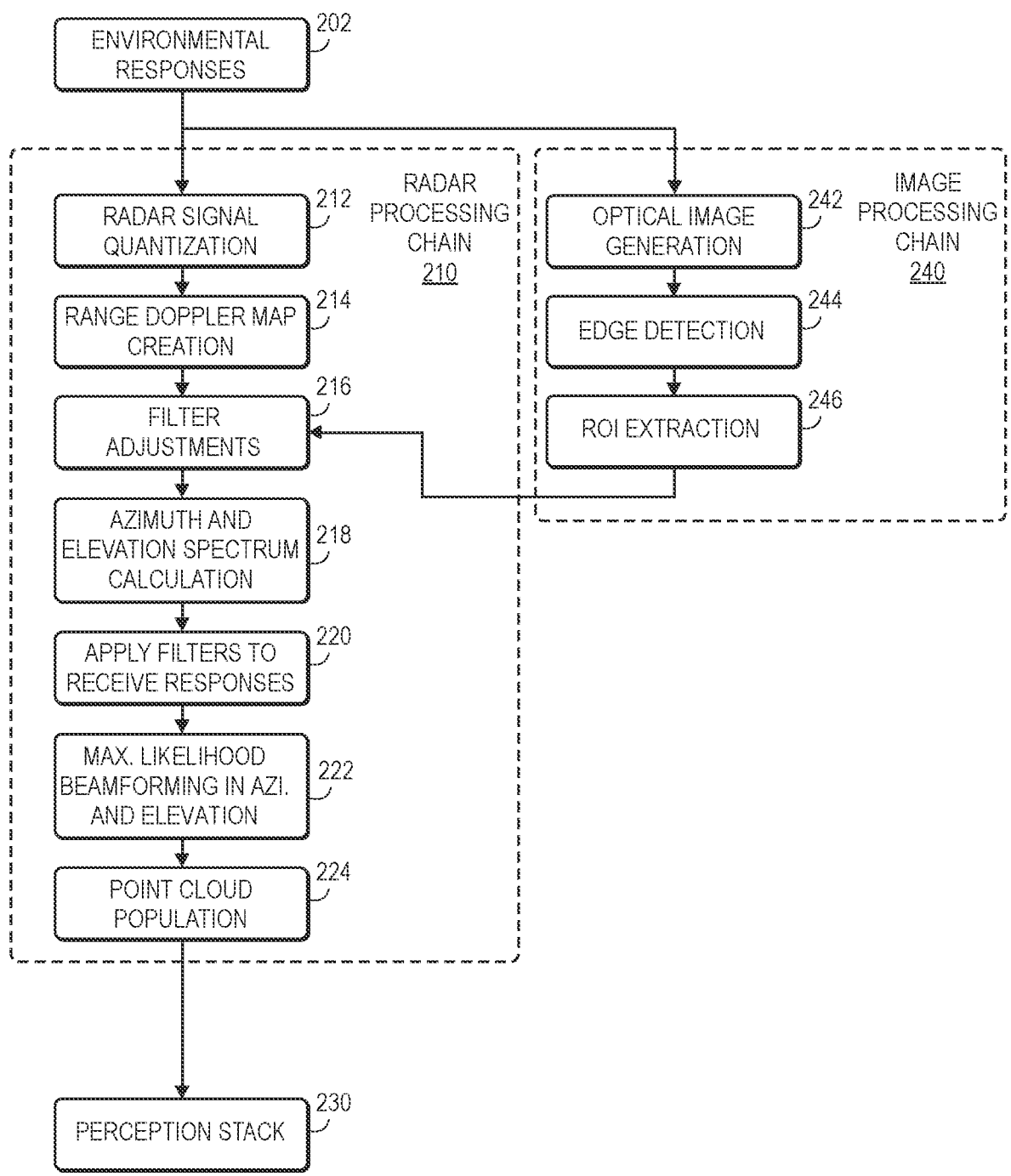
FIG. 2 illustrates a computer-implemented method 200 for operations of an image processing chain and a RADAR processing chain of a vehicle in accordance with some examples of the present disclosure.

FIG. 2 illustrates a computer-implemented method 200 for operations of an image processing chain and a RADAR processing chain of a vehicle in accordance with some examples of the present disclosure.

This computer-implemented method 200 can be performed by processing logic of a computing system that may comprise hardware (circuitry, dedicated logic, a processor, etc.), software (e.g., planning software, planning layer, or planning solver run on a general purpose computer system or a dedicated machine or a device), or a combination of both. The operations of method 200 can be performed by a RADAR processing chain 210, an image processing chain 240, local computing device 410 or remoting data center 450 of FIG. 4, the processor 610 of FIG. 6, or the system 1202 of FIG. 7.

In some examples, the RADAR processing chain 210 performs operations 212, 214, 216, 218, 220, 222, and 224. The image processing chain 240 performs operations 242, 244, and 246. Any spatial offsets between the cameras and RADAR sensors are stored within a cache or memory for a RADAR processor during extrinsic calibration.

The sensors of a vehicle transmit electromagnetic (EM) waves in a radio domain. At operation 202, the computer-implemented method includes receiving environment radio frequency (RF) responses with receivers of the sensors (e.g., RADAR sensors) of the vehicle (e.g., autonomous vehicle with full driving automation (level 5) and no human attention needed, high driving automation (level 4) with no human attention needed in most circumstances, conditional driving automation (level 3) with a human ready to override the AV, partial automation mode (level 2) with the vehicle having automated functions such as acceleration and steering but the driver remains engaged with the driver task and monitors an environment, and driver assistance mode (level 1) with the vehicle controlled by the driver but some driver assist features). RADAR sensors transmit electromagnetic (EM) waves and receive an echo receive response from reflections of the transmitted EM waves in a driving environment of the vehicle. The time taken by the RF waves to return from the obstacles or objects to the receivers of the RADAR sensors is used for calculating the distance, angle, and velocity of the obstacles or objects in the surroundings of the autonomous vehicle. A RADAR processing chain 210 can receive and process the environment RF responses. A RADAR processing chain 210 may include a transceiver with one or more antenna arrays, a RF generator, a microprocessor or processor to control operations of the RADAR processing chain 210, a digital-to-analog converter, an analog-to-digital converter, a mixer circuitry, and a polyphase filter structure.

At operation 212, the computer-implemented method includes performing RADAR signal quantization (e.g., down converting the received RF responses and then digitizing the down converted RF responses into RF signals). At operation 214, the computer-implemented method includes calculating a Range-Doppler map of the recorded RF signals.

At operation 216, the computer-implemented method includes performing polyphase filter adjustments of the RADAR processing chain based on ROI information from the image processing chain 240. In one example, a series of polyphase filter weights of a polyphase filter structure are adjusted based on receiving free space area boundaries (e.g., regions of interest (ROI) boundaries) from the image processing chain 240. The ROI boundaries from the image processing chain 240 guide the adjusting of the polyphase filter weights of the RADAR processing chain.

At operation 242, the image processing chain 240 performs optical image generation based on receiving images of the driving environment from cameras of the vehicle. The received images are processed using a convolutional neural network (CNN) that performs a border extraction process for edge detection of objects at operation 244. A second stage CNN is then used to estimate the ROI boundaries at operation 246. The ROI information is then transferred to the RADAR processing chain 210. The ROI information includes area boundary coordinates including a bounding box with x, y coordinate edges and channel entropy to indicate a complexity of an object for the ROI boundaries. Boundary coordinates are provided for one or more detected objects. The channel entropy includes a number of discrete samples as functions, a number of details in the ROI, and locations in a frequency spectrum.

Returning to the RADAR processing chain 210, the method 200 includes calculating an angular spectrum (e.g., the Azimuth and elevation spectrum) of the Range-Doppler map at operation 218.

At operation 220, the computer-implemented method includes applying the receiver antenna individual polyphase filters to the individual receiver antenna responses to attenuate or remove regions that are not within ROI area boundary coordinates from the image processing chain 240.

At operation 222, the computer-implemented method includes performing a maximum likelihood estimation for the azimuth based on the azimuth spectrum behavior and performing a maximum likelihood estimation for the elevation based on the elevation spectrum behavior. At operation 224, the computer-implemented method includes populating RADAR point cloud data based on the maximum likelihood estimations for the azimuth and elevation. At operation 230, the computer-implemented method includes transferring the point cloud data into a perception stack (e.g., perception stack 412).

The perception stack can detect and classify objects and determine their current and predicted locations, speeds, and directions based on the point cloud data. The perception stack can also identify environmental uncertainties, such as where to look for moving objects, flag areas that may be obscured or blocked from view, and so forth.

Figure 3:
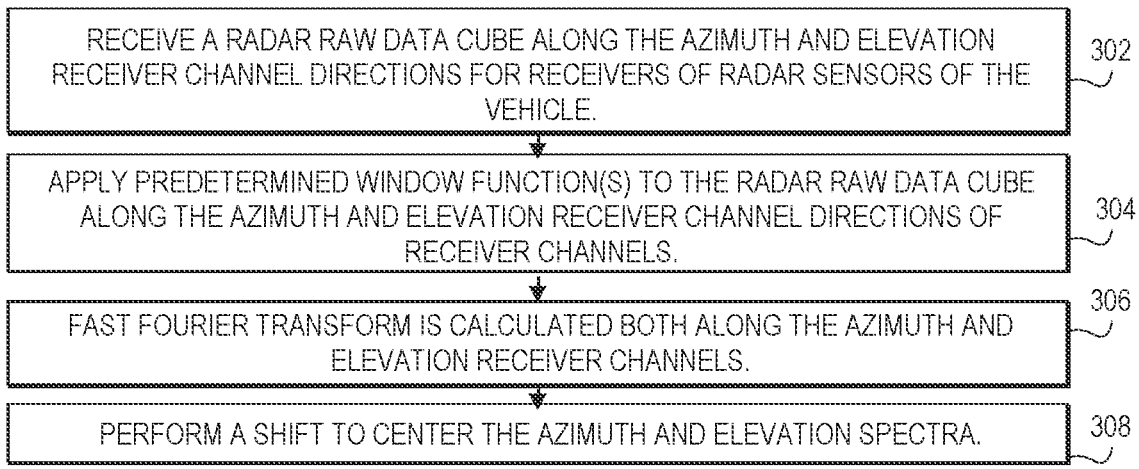
FIG. 3 illustrates a computer-implemented method 300 for calculating an angular spectrum of receive responses of RADAR sensors of a vehicle in accordance with some examples of the present disclosure.

FIG. 3 illustrates a computer-implemented method 300 for calculating an angular spectrum of receive responses of RADAR sensors of a vehicle in accordance with some examples of the present disclosure.

This computer-implemented method 300 can be performed by processing logic of a computing system that may comprise hardware (circuitry, dedicated logic, a processor, etc.), software (e.g., planning software, planning layer, or planning solver run on a general purpose computer system or a dedicated machine or a device), or a combination of both. The method 300 can be performed by the RADAR processing chain 210.

At operation 302, the computer-implemented method includes receiving a RADAR raw data cube along the azimuth and elevation receiver channel directions for receivers of RADAR sensors of the vehicle. At operation 304, the computer-implemented method includes applying predetermined window function(s) to the RADAR raw data cube along the azimuth and elevation receiver channel directions of receiver channels. The window function being applied may be different between the azimuth and elevation receiver channels. The main difference between both functions will be their lengths, as the azimuth and elevation fields have different spans. A window function operates over a window frame, that is a set of rows relative to a current row. A window function is a mathematical function that is zero-valued outside of a chosen interval. Then, at operation 306, a Fast Fourier Transform is calculated both along the azimuth and elevation receiver channels. At operation 308, a shift is performed to center the azimuth and elevation spectra.

This calculation of angular spectrum is challenging due to evenly spaced antenna arrays receiving unevenly sampled RF responses. Interpolation is performed as part of method 300 to address the unevenly sampled RF responses.

Figure 4:
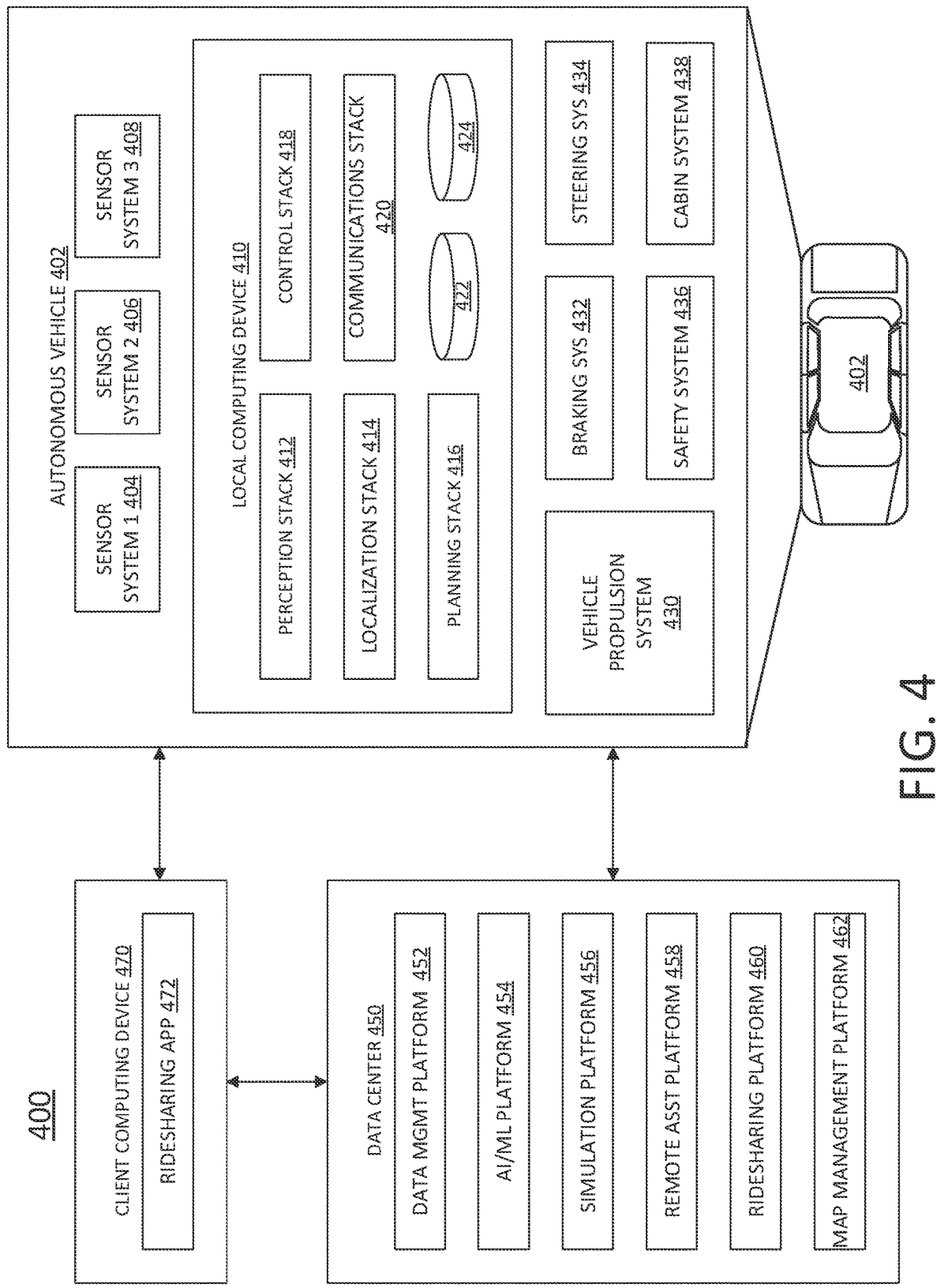
FIG. 4 illustrates an example of an AV management system 400.

Turning now to FIG. 4, this figure illustrates an example of an AV management system 400. One of ordinary skill in the art will understand that, for the AV management system 400 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 400 includes an AV 402, a data center 450, and a client computing device 470. The AV 402, the data center 450, and the client computing device 470 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 402 can navigate about roadways without a human driver based on sensor signals generated by multiple sensor systems 404, 406, and 408. The sensor systems 404-408 can include different types of sensors and can be arranged about the AV 402. For instance, the sensor systems 404-408 can comprise Inertial Measurement Units (IMUs), cameras (e.g., still image cameras, video cameras, etc.), light sensors (e.g., LIDAR systems, ambient light sensors, infrared sensors, etc.), RADAR systems with RADAR sensors, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 404 can be a camera system, the sensor system 406 can be a LIDAR system, and the sensor system 408 can be a RADAR system. Other embodiments may include any other number and type of sensors. The RADAR system transmits electromagnetic (EM) waves in a radio domain and receives environment radio frequency (RF) responses that have been reflected from structures of a driving environment of a vehicle as discussed herein including operations of FIGS. 1 and 2.

AV 402 can also include several mechanical systems that can be used to maneuver or operate AV 402. For instance, the mechanical systems can include vehicle propulsion system 430, braking system 432, steering system 434, safety system 436, and cabin system 438, among other systems. Vehicle propulsion system 430 can include an electric motor, an internal combustion engine, or both. The braking system 432 can include an engine brake, a wheel braking system (e.g., a disc braking system that utilizes brake pads), hydraulics, actuators, and/or any other suitable componentry configured to assist in decelerating AV 402. The steering system 434 can include suitable componentry configured to control the direction of movement of the AV 402 during navigation. Safety system 436 can include lights and signal indicators, a parking brake, airbags, and so forth. The cabin system 438 can include cabin temperature control systems, in-cabin entertainment systems, and so forth. In some embodiments, the AV 402 may not include human driver actuators (e.g., steering wheel, handbrake, foot brake pedal, foot accelerator pedal, turn signal lever, window wipers, etc.) for controlling the AV 402. Instead, the cabin system 438 can include one or more client interfaces (e.g., Graphical User Interfaces (GUIs), Voice User Interfaces (VUIs), etc.) for controlling certain aspects of the mechanical systems 430-438.

AV 402 can additionally include a local computing device 410 that is in communication with the sensor systems 404-408, the mechanical systems 430-438, the data center 450, and the client computing device 470, among other systems. The local computing device 410 can include one or more processors and memory, including instructions that can be executed by the one or more processors. The instructions can make up one or more software stacks or components responsible for controlling the AV 402; communicating with the data center 450, the client computing device 470, and other systems; receiving inputs from riders, passengers, and other entities within the AV's environment; logging metrics collected by the sensor systems 404-408; and so forth. In this example, the local computing device 410 includes a perception stack 412, a mapping and localization stack 414, a planning stack 416, a control stack 418, a communications stack 420, a High Definition (HD) geospatial database 422, and an AV operational database 424, among other stacks and systems.

Perception stack 412 can enable the AV 402 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 404-408, the mapping and localization stack 414, the HD geospatial database 422, other components of the AV, and other data sources (e.g., the data center 450, the client computing device 470, third-party data sources, etc.). The perception stack 412 can detect and classify objects and determine their current and predicted locations, speeds, directions, and the like. In addition, the perception stack 412 can determine the free space around the AV 402 (e.g., to maintain a safe distance from other objects, change lanes, park the AV, etc.). The perception stack 412 can also identify environmental uncertainties, such as where to look for moving objects, flag areas that may be obscured or blocked from view, and so forth.

Mapping and localization stack 414 can determine the AV's position and orientation (pose) using different methods from multiple systems (e.g., GPS, IMUs, cameras, LIDAR, RADAR, ultrasonic sensors, the HD geospatial database 422, etc.). For example, in some embodiments, the AV 402 can compare sensor data captured in real-time by the sensor systems 404-408 to data in the HD geospatial database 422 to determine its precise (e.g., accurate to the order of a few centimeters or less) position and orientation. The AV 402 can focus its search based on sensor data from one or more first sensor systems (e.g., GPS) by matching sensor data from one or more second sensor systems (e.g., LIDAR). If the mapping and localization information from one system is unavailable, the AV 402 can use mapping and localization information from a redundant system and/or from remote data sources.

The planning stack 416 can determine how to maneuver or operate the AV 402 safely and efficiently in its environment. For example, the planning stack 416 can receive the location, speed, and direction of the AV 402, geospatial data, data regarding objects sharing the road with the AV 402 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 402 from one point to another. The planning stack 416 can determine multiple sets of one or more mechanical operations that the AV 402 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 416 can select from multiple backup plans to carry out. For example, while preparing to change lanes to turn right at an intersection, another vehicle may aggressively cut into the destination lane, making the lane change unsafe. The planning stack 416 could have already determined an alternative plan for such an event, and upon its occurrence, help to direct the AV 402 to go around the block instead of blocking a current lane while waiting for an opening to change lanes.

The control stack 418 can manage the operation of the vehicle propulsion system 430, the braking system 432, the steering system 434, the safety system 436, and the cabin system 438. The control stack 418 can receive sensor signals from the sensor systems 404-408 as well as communicate with other stacks or components of the local computing device 410 or a remote system (e.g., the data center 450) to effectuate operation of the AV 402. For example, the control stack 418 can implement the final path or actions from the multiple paths or actions provided by the planning stack 416. This can involve turning the routes and decisions from the planning stack 416 into commands for the actuators that control the AV's steering, throttle, brake, and drive unit.

The communication stack 420 can transmit and receive signals between the various stacks and other components of the AV 402 and between the AV 402, the data center 450, the client computing device 470, and other remote systems. The communication stack 420 can enable the local computing device 410 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 420 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 422 can store HD maps and related data of the streets upon which the AV 402 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 424 can store raw AV data generated by the sensor systems 404-408 and other components of the AV 402 and/or data received by the AV 402 from remote systems (e.g., the data center 450, the client computing device 470, etc.). In some embodiments, the raw AV data can include HD LIDAR point cloud data, image or video data, RADAR data, GPS data, and other sensor data that the data center 450 can use for creating or updating AV geospatial data as discussed further below with respect to FIG. 5 and elsewhere in the present disclosure.

The data center 450 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 450 can include one or more computing devices remote to the local computing device 410 for managing a fleet of AVs and AV-related services. For example, in addition to managing the AV 402, the data center 450 may also support a ridesharing service, a delivery service, a remote/roadside assistance service, street services (e.g., street mapping, street patrol, street cleaning, street metering, parking reservation, etc.), and the like.

The data center 450 can send and receive various signals to and from the AV 402 and the client computing device 470. These signals can include sensor data captured by the sensor systems 404-408, roadside assistance requests, software updates, ridesharing pick-up and drop-off instructions, and so forth. In this example, the data center 450 includes one or more of a data management platform 452, an Artificial Intelligence/Machine Learning (AI/ML) platform 454, a simulation platform 456, a remote assistance platform 458, a ridesharing platform 460, and a map management platform 462, among other systems.

Data management platform 452 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 450 can access data stored by the data management platform 452 to provide their respective services.

The AI/ML platform 454 can provide the infrastructure for training and evaluating machine learning algorithms for operating the AV 402, the simulation platform 456, the remote assistance platform 458, the ridesharing platform 460, the map management platform 462, and other platforms and systems. Using the AI/ML platform 454, data scientists can prepare data sets from the data management platform 452; select, design, and train machine learning models; evaluate, refine, and deploy the models; maintain, monitor, and retrain the models; and so on.

The simulation platform 456 can enable testing and validation of the algorithms, machine learning models, neural networks, and other development efforts for the AV 402, the remote assistance platform 458, the ridesharing platform 460, the map management platform 462, and other platforms and systems. The simulation platform 456 can replicate a variety of driving environments and/or reproduce real-world scenarios from data captured by the AV 402, including rendering geospatial information and road infrastructure (e.g., streets, lanes, crosswalks, traffic lights, stop signs, etc.) obtained from the map management platform 462; modeling the behavior of other vehicles, bicycles, pedestrians, and other dynamic elements; simulating inclement weather conditions, different traffic scenarios; and so on.

The remote assistance platform 458 can generate and transmit instructions regarding the operation of the AV 402. For example, in response to an output of the AI/ML platform 454 or other system of the data center 450, the remote assistance platform 458 can prepare instructions for one or more stacks or other components of the AV 402.

The ridesharing platform 460 can interact with a customer of a ridesharing service via a ridesharing application 472 executing on the client computing device 470. The client computing device 470 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 472. The client computing device 470 can be a customer's mobile computing device or a computing device integrated with the AV 402 (e.g., the local computing device 410). The ridesharing platform 460 can receive requests to be picked up or dropped off from the ridesharing application 472 and dispatch the AV 402 for the trip.

Map management platform 462 can provide a set of tools for the manipulation and management of geographic and spatial (geospatial) and related attribute data. The data management platform 452 can receive LIDAR point cloud data, image data (e.g., still image, video, etc.), RADAR data, GPS data, and other sensor data (e.g., raw data) from one or more AVs 402, Unmanned Aerial Vehicles (UAVs), satellites, third-party mapping services, and other sources of geospatially referenced data. The raw data can be processed, and map management platform 462 can render base representations (e.g., tiles (2D), bounding volumes (3D), etc.) of the AV geospatial data to enable users to view, query, label, edit, and otherwise interact with the data. Map management platform 462 can manage workflows and tasks for operating on the AV geospatial data. Map management platform 462 can control access to the AV geospatial data, including granting or limiting access to the AV geospatial data based on user-based, role-based, group-based, task-based, and other attribute-based access control mechanisms. Map management platform 462 can provide version control for the AV geospatial data, such as to track specific changes that (human or machine) map editors have made to the data and to revert changes when necessary. Map management platform 462 can administer release management of the AV geospatial data, including distributing suitable iterations of the data to different users, computing devices, AVs, and other consumers of HD maps. Map management platform 462 can provide analytics regarding the AV geospatial data and related data, such as to generate insights relating to the throughput and quality of mapping tasks.

In some embodiments, the map viewing services of map management platform 462 can be modularized and deployed as part of one or more of the platforms and systems of the data center 450. For example, the AI/ML platform 454 may incorporate the map viewing services for visualizing the effectiveness of various object detection or object classification models, the simulation platform 456 may incorporate the map viewing services for recreating and visualizing certain driving scenarios, the remote assistance platform 458 may incorporate the map viewing services for replaying traffic incidents to facilitate and coordinate aid, the ridesharing platform 460 may incorporate the map viewing services into the client application 472 to enable passengers to view the AV 402 in transit en route to a pick-up or drop-off location, and so on.

Figure 5:
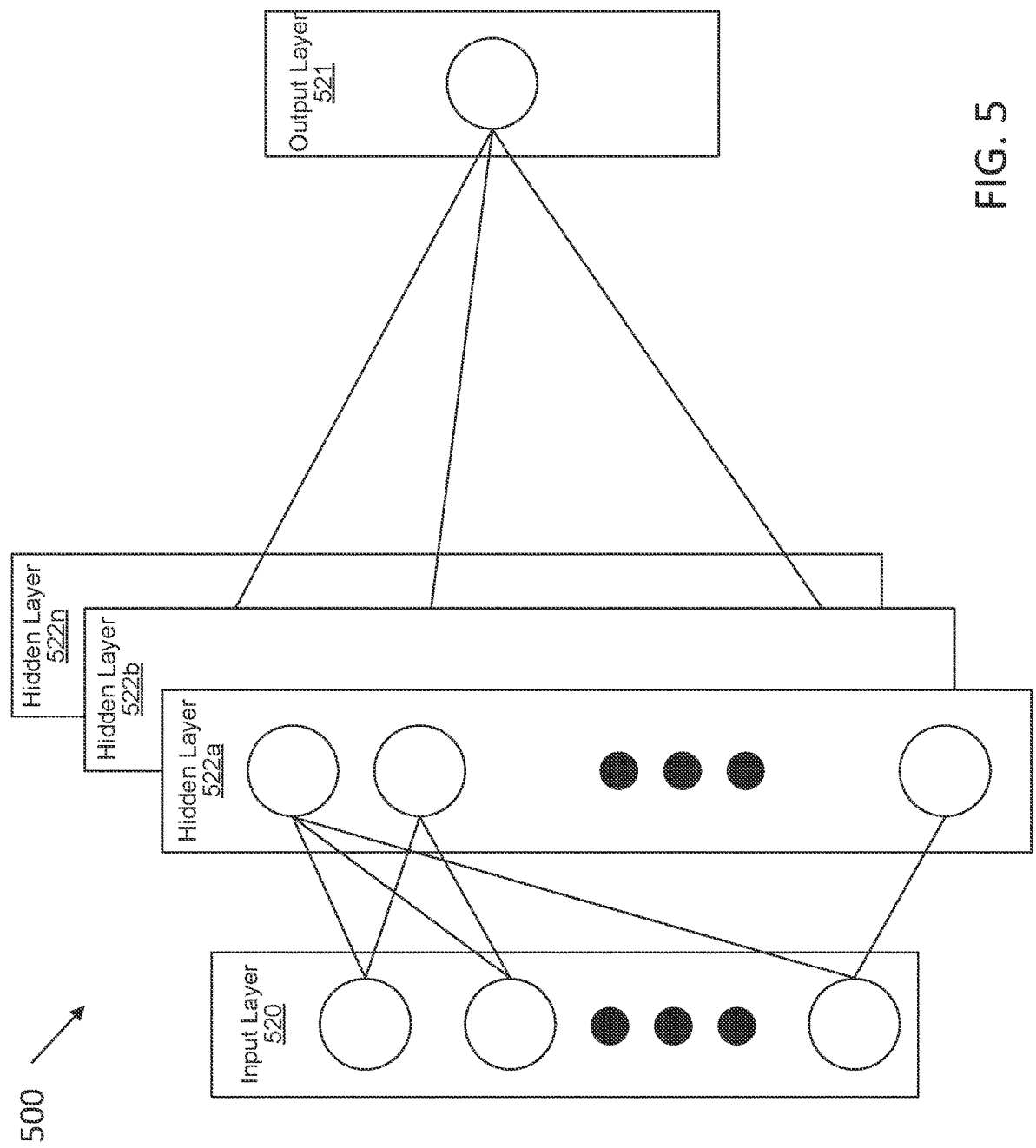
FIG. 5 is an illustrative example of a deep learning neural network 500 that can be used to implement all or a portion of a perception module (or perception system).

In FIG. 5, the disclosure now turns to a further discussion of models that can be used through the environments and techniques described herein. Specifically, FIG. 5 is an illustrative example of a deep learning neural network 500. An input layer 520 can be configured to receive sensor data (e.g., RADAR sensor data, image sensor data) and/or data relating to an environment surrounding an AV. The neural network 500 includes multiple hidden layers 522*a*, 522*b*, through 522*n*. The hidden layers 522*a*, 522*b*, through 522*n* include "n" number of hidden layers, where "n" is an integer greater than or equal to one. The number of hidden layers can be made to include as many layers as needed for the given application. The neural network 500 further includes an output layer 521 that provides an output resulting from the processing performed by the hidden layers 522*a*, 522*b*, through 522*n*. In one illustrative example, the received images captured by cameras of a vehicle are processed as an input layer 520 and the output layer 521 can estimate the ROI boundaries.

The neural network 500 is a multi-layer neural network of interconnected nodes. Each node can represent a piece of information. Information associated with the nodes is shared among the different layers and each layer retains information as information is processed. In some cases, the neural network 500 can include a feed-forward network, in which case there are no feedback connections where outputs of the network are fed back into itself. In some cases, the neural network 500 can include a recurrent neural network, which can have loops that allow information to be carried across nodes while reading in input.

Information can be exchanged between nodes through node-to-node interconnections between the various layers. Nodes of the input layer 520 can activate a set of nodes in the first hidden layer 522*a*. For example, as shown, each of the input nodes of the input layer 520 is connected to each of the nodes of the first hidden layer 522*a*. The nodes of the first hidden layer 522*a* can transform the information of each input node by applying activation functions to the input node information. The information derived from the transformation can then be passed to and can activate the nodes of the next hidden layer 522*b*, which can perform their own designated functions. Example functions include convolutional, up-sampling, data transformation, and/or any other suitable functions. The output of the hidden layer 522*b* can then activate nodes of the next hidden layer, and so on. The output of the last hidden layer 522*n* can activate one or more nodes of the output layer 521, at which an output is provided. In some cases, while nodes in the neural network 500 are shown as having multiple output lines, a node can have a single output and all lines shown as being output from a node represent the same output value.

In some cases, each node or interconnection between nodes can have a weight that is a set of parameters derived from the training of the neural network 500. Once the neural network 500 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 500 to be adaptive to inputs and able to learn as more and more data is processed.

The neural network 500 is pre-trained to process the features from the data in the input layer 520 using the different hidden layers 522*a*, 522*b*, through 522*n* in order to provide the output through the output layer 521.

In some cases, the neural network 500 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 500 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as $$E\_total = \sum \left(\frac{1}{2}(\text{target} - \text{output})^2\right).$$

The loss can be set to be equal to the value of E_total.

The loss (or error) will be high for the initial training data since the actual values will be much different than the predicted output. The goal of training is to minimize the amount of loss so that the predicted output is the same as the training output. The neural network 500 can perform a backward pass by determining which inputs (weights) most contributed to the loss of the network, and can adjust the weights so that the loss decreases and is eventually minimized.

The neural network 500 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 500 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 6:
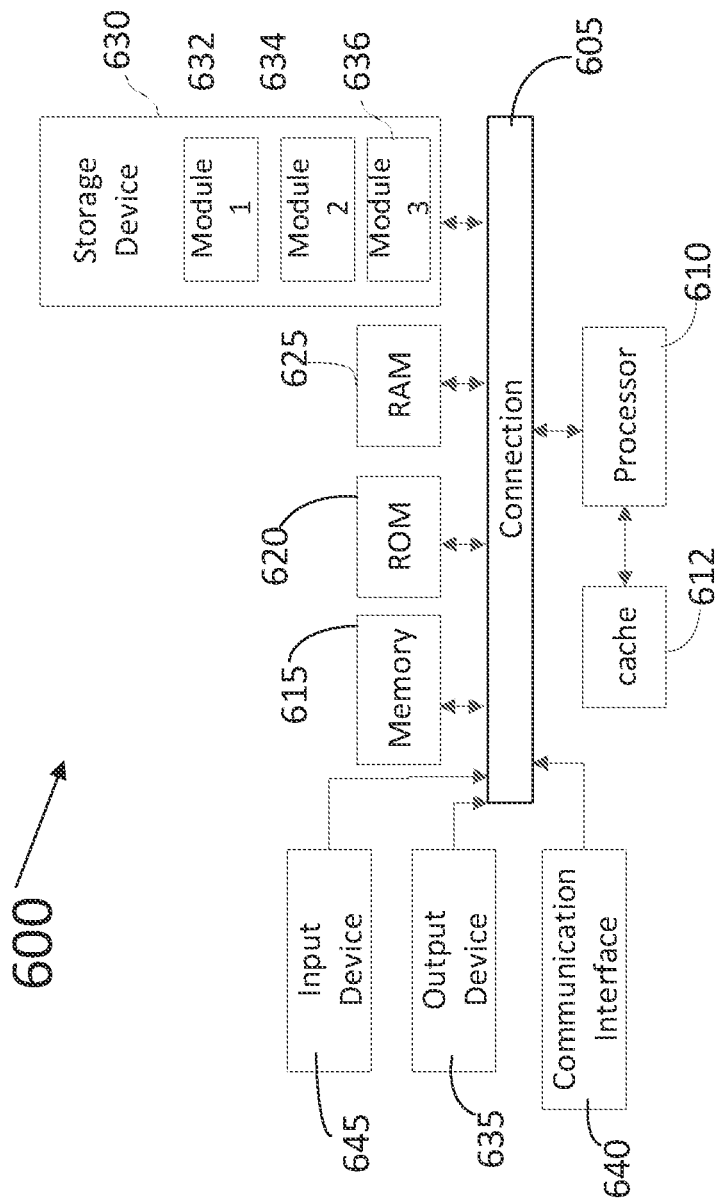
FIG. 6 illustrates an example processor-based system with which some aspects of the subject technology can be implemented.

FIG. 6 illustrates an example processor-based system with which some aspects of the subject technology can be implemented. For example, processor-based system 600 can be any computing device making up, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (Central Processing Unit (CPU) or processor) 610 and connection 605 that couples various system components including system memory 615, such as Read-Only Memory (ROM) 620 and Random-Access Memory (RAM) 625 to processor 610. Computing system 600 can include a cache of high-speed memory 612 connected directly with, in close proximity to, or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 630 can include software services, servers, services, etc., that when the code that defines such software is executed by the processor 610, it causes the system 600 to perform a function. For example, the processor 610 can execute operations of any of the methods (e.g., the methods 100, 200, or 300) described herein. In some embodiments, a hardware service that performs a particular function can include the software component stored in a computer-readable medium in connection with the necessary hardware components, such as processor 610, connection 605, output device 635, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Figure 7:
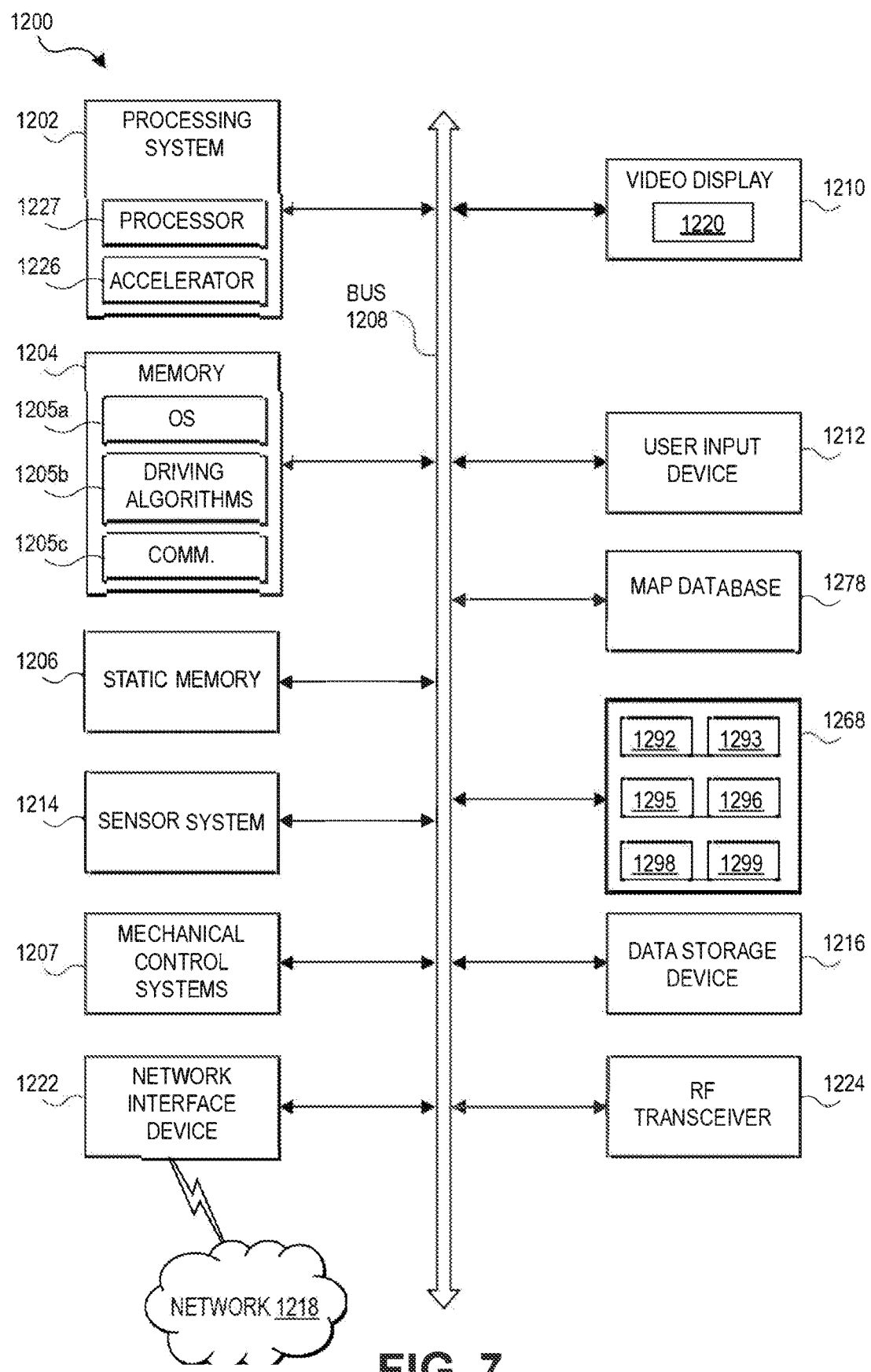
FIG. 7 is a block diagram of a vehicle 1200 having driver assistance according to some examples of the present disclosure.

FIG. 7 is a block diagram of a vehicle 1200 having driver assistance according to an embodiment of the disclosure. The driver assistance features of the vehicle 1200 can include one or more of adaptive cruise control, collision avoidance systems, connecting smartphones for hands-free dialing, automatic braking, satellite navigation, traffic warnings, etc.). Within the processing system 1202 (or computer system 1202) is a set of instructions (one or more software programs) for causing the machine to perform any one or more of the methodologies discussed herein including methods 100, 200, or 300. In alternative embodiments, the machine may be connected (e.g., networked) to other machines in a LAN, an intranet, an extranet, or the Internet. The machine can operate in the capacity of a server or a client in a client-server network environment, or as a peer machine in a peer-to-peer (or distributed) network environment, the machine can also operate in the capacity of a web appliance, a server, a network router, switch or bridge, event producer, distributed node, centralized system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The processing system 1202, as disclosed above, includes processing logic in the form of a general purpose instruction-based processor 1227 or an accelerator 1226 (e.g., graphics processing units (GPUs), FPGA, ASIC, etc.)). The general purpose instruction-based processor may be one or more general purpose instruction-based processors or processing devices (e.g., microprocessor, central processing unit, or the like). More particularly, processing system 1202 may be a complex instruction set computing (CISC) microprocessor, reduced instruction set computing (RISC) microprocessor, very long instruction word (VLIW) microprocessor, general purpose instruction-based processor implementing other instruction sets, or general purpose instruction-based processors implementing a combination of instruction sets. The accelerator may be one or more special-purpose processing devices such as an application specific integrated circuit (ASIC), a field programmable gate array (FPGA), a digital signal general purpose instruction-based processor (DSP), network general purpose instruction-based processor, many light-weight cores (MLWC) or the like. Processing system 1202 is configured to perform the operations and methods discussed herein. The exemplary vehicle 1200 includes a processing system 1202, main memory 1204 (e.g., read-only memory (ROM), flash memory, dynamic random access memory (DRAM) such as synchronous DRAM (SDRAM) or DRAM (RDRAM), etc.), a static memory 1206 (e.g., flash memory, static random access memory (SRAM), etc.), and a data storage device 1216 (e.g., a secondary memory unit in the form of a drive unit, which may include fixed or removable non-transitory computer-readable storage medium), which communicate with each other via a bus 1208. The storage units disclosed herein may be configured to implement the data storing mechanisms for performing the operations and methods discussed herein. Memory 1206 can store code and/or data for use by processor 1227 or accelerator 1226. Memory 1206 include a memory hierarchy that can be implemented using any combination of RAM (e.g., SRAM, DRAM, DDRAM), ROM, FLASH, magnetic and/or optical storage devices. Memory may also include a transmission medium for carrying information-bearing signals indicative of computer instructions or data (with or without a carrier wave upon which the signals are modulated).

Processor 1227 and accelerator 1226 execute various software components stored in memory 1204 to perform various functions for system 1202. Furthermore, memory 1206 may store additional modules and data structures not described above.

The vehicle 1200 includes a map database 1278 that downloads and stores map information for different and various locations, where the map database 1278 is in communication with the bus 1208.

The processor 1268 would include a number of algorithms and sub-systems for providing perception and coordination features including perception input 1296, central sensor fusion 1298, external object state 1295, host state 1292, situation awareness 1293 and localization and maps 1299.

Operating system 1205a includes various procedures, sets of instructions, software components and/or drivers for controlling and managing general system tasks and facilitates communication between various hardware and software components. Driving algorithms 1205b (e.g., object detection, segmentation, path planning, method 700, etc.) utilize sensor data from the sensor system 1214 to provide object detection, segmentation, deterministic selection in a parallelized asynchronous multi-objective optimizer for planning trajectory of a vehicle, and driver assistance features for different applications such as driving operations of vehicles. A communication module 1205c provides communication with other devices utilizing the network interface device 1222 or RF transceiver 1224.

The vehicle 1200 may further include a network interface device 1222. In an alternative embodiment, the data processing system disclosed is integrated into the network interface device 1222 as disclosed herein. The vehicle 1200 also may include a video display unit 1210 (e.g., a liquid crystal display (LCD), LED, or a cathode ray tube (CRT)) connected to the computer system through a graphics port and graphics chipset, an input device 1212 (e.g., a keyboard, a mouse), and a Graphic User Interface (GUI) 1220 (e.g., a touch-screen with input & output functionality) that is provided by the video display unit 1210.

The vehicle 1200 may further include a RF transceiver 1224 that provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/de-interleaving, spreading/dispreading, inverse fast Fourier transforming (IFFT)/fast Fourier transforming (FFT), cyclic prefix appending/removal, and other signal processing functions.

The data storage device 1216 may include a machine-readable storage medium (or more specifically a non-transitory computer-readable storage medium) on which is stored one or more sets of instructions embodying any one or more of the methodologies or functions described herein. Disclosed data storing mechanism may be implemented, completely or at least partially, within the main memory 1204 and/or within the data processing system 1202, the main memory 1204 and the data processing system 1202 also constituting machine-readable storage media.

In one example, the vehicle 1200 with driver assistance is an autonomous vehicle that may be connected (e.g., networked) to other machines or other autonomous vehicles using a network 1218 (e.g., LAN, WAN, cellular network, or any network). The vehicle can be a distributed system that includes many computers networked within the vehicle. The vehicle can transmit communications (e.g., across the Internet, any wireless communication) to indicate current conditions (e.g., an alarm collision condition indicates close proximity to another vehicle or object, a collision condition indicates that a collision has occurred with another vehicle or object, etc.). The vehicle can operate in the capacity of a server or a client in a client-server network environment, or as a peer machine in a peer-to-peer (or distributed) network environment. The storage units disclosed in vehicle 1200 may be configured to implement data storing mechanisms for performing the operations of autonomous vehicles.

The vehicle 1200 also includes sensor system 1214 and mechanical control systems 1207 (e.g., chassis control, vehicle propulsion system, driving wheel control, brake control, etc.). The system 1202 executes software instructions to perform different features and functionality (e.g., driving decisions, deterministic selection in a parallelized asynchronous multi-objective optimizer for planning trajectory) and provide a graphical user interface 1220 for an occupant of the vehicle. The system 1202 performs the different features and functionality for autonomous operation of the vehicle based at least partially on receiving input from the sensor system 1214 that includes lidar sensors, cameras, RADAR, GPS, and additional sensors. The system 1202 may be an electronic control unit for the vehicle.

SELECTED EXAMPLES

The following are non-limiting examples.

Example 1—a computer implemented method for using computer vision to guide processing of receive radio frequency (RF) responses of radio detection and ranging (RADAR) sensors of a vehicle in a driving environment. The computer implemented method comprises receiving, with one or more receivers of the RADAR sensors, environment receive RF responses; receiving region of interest (ROI) information including segments of a tentative set of ROIs with free space area boundaries from an image processor of an image processing chain for the computer vision; dynamically determining a number of polyphase filters based on a number of ROIs having dynamic scenes that are provided by the image processing chain; and adjusting parameters of the polyphase filters of a RADAR processing chain based on the ROI information.

Example 2—The computer implemented method of Example 1, wherein adjusting parameters of the polyphase filters of the RADAR processing chain comprises adjusting filter weights, phase, and magnitude of the receive RF responses based on the ROI information.

Example 3—the computer implemented method of any of Examples 1-2, further comprises down converting the receive RF responses and then digitizing the down converted RF responses into RF signals; and calculating a Range-Doppler map of the recorded RF signals.

Example 4—the computer implemented method of any of Examples 1-3, further comprises calculating the Azimuth and elevation spectrum of the Range-Doppler map to determine a 1:1 correspondence in a frequency domain between x and y coordinates for the receive RF responses.

Example 5—the computer implemented method of any of Examples 1-4, further comprises adaptively applying dynamic polyphase filters to the receive RF responses to eliminate undesired responses and to generate a sparse data set.

Example 6—The computer implemented method of any of Examples 1-5, further comprises performing a maximum likelihood beamforming for the azimuth based on the azimuth spectrum behavior within the sparse data set and performing a maximum likelihood beamforming for the elevation based on the elevation spectrum behavior within the sparse data set.

Example 7—the computer implemented method of any of Examples 1-6, further comprises populating RADAR point cloud data without artifacts for the driving environment based on the maximum likelihood beamforming for the azimuth and elevation; and transferring the RADAR point cloud data into a perception stack of the vehicle.

Example 8—the computer implemented method of any of Examples 1-7, wherein the ROI information includes ROI boundaries with x coordinate, y coordinate edges, and channel entropy to indicate complexity of an object.

Example 9—a computing system, comprises a memory storing instructions; and a processor coupled to the memory. The processor is configured to execute instructions of a software program to receive with a RADAR processing chain environment receive radio frequency (RF) responses that are based on electromagnetic (EM) waves in a radio domain originating from RADAR sensors of a vehicle; receive region of interest (ROI) information including segments of a tentative set of ROIs with free space area boundaries from an image processing chain; dynamically determine a number of polyphase filters of the RADAR processing chain based on a number of ROIs having dynamic scenes that are provided by the image processing chain; and adjust parameters of the polyphase filters of the RADAR processing chain based on the ROI information.

Example 10—the computing system of Example 9, wherein adjusting parameters of the polyphase filters comprises adjusting filter weights, phase, and magnitude of the receive RF responses based on the ROI information.

Example 11—The computing system of any of Examples 9-10, wherein the processor is configured to execute instructions of the software program to calculate the Azimuth and elevation spectrum of a Range-Doppler map to determine a 1:1 correspondence in a frequency domain between x and y coordinates for the receive RF responses.

Example 12—the computing system of any of Examples 9-11, wherein the processor is configured to execute instructions of the software program to adaptively apply dynamic polyphase filters to the receive RF responses to eliminate undesired responses and to generate a sparse data set.

Example 13—the computing system of any of Examples 9-12, wherein the processor is configured to execute instructions of the software program to perform a maximum likelihood beamforming for the azimuth based on the azimuth spectrum behavior within the sparse data set; and perform a maximum likelihood beamforming for the elevation based on the elevation spectrum behavior within the sparse data set.

Example 14—the computing system of any of Examples 9-13, wherein the processor is configured to execute instructions of the software program to populate RADAR point cloud data based on the maximum likelihood beamforming for the azimuth and elevation; and transfer the point cloud data into a perception stack.

Example 15—the computing system of any of Examples 9-14, wherein the ROI information includes ROI boundaries with x coordinate, y coordinate edges, and channel entropy to indicate complexity of an object.

Example 16—a non-transitory computer readable storage medium having embodied thereon a program, wherein the program is executable by a processor to perform a method that comprises receiving, with a RADAR processing chain, environment receive radio frequency (RF) responses from RADAR sensors of a vehicle; receiving region of interest (ROI) information including segments of a tentative set of ROIs with free space area boundaries from an image processing chain; dynamically determining a number of polyphase filters based on a number of ROIs having dynamic scenes that are provided by the image processing chain; and adjusting parameters of the polyphase filters of the RADAR processing chain based on the ROI information.

Example 17—the non-transitory computer readable storage medium of Example 16, the method further comprises receiving a RADAR raw data cube along azimuth and elevation receiver channel directions for receivers of the RADAR sensors of the vehicle; applying one or more predetermined window functions to the RADAR raw data cube along the azimuth and elevation receiver channel directions of receiver channels; and calculating a Fast Fourier Transform both along the azimuth and elevation receiver channels.

Example 18—The non-transitory computer readable storage medium of any of Examples 16-17, the method further comprises applying dynamic polyphase filters to the receive RF responses to eliminate undesired responses and to generate a sparse data set.

Example 19—The non-transitory computer readable storage medium of any of Examples 16-18, the method further comprises performing a maximum likelihood beamforming for the azimuth based on the azimuth spectrum behavior within the sparse data set; and performing a maximum likelihood beamforming for the elevation based on the elevation spectrum behavior within the sparse data set.

Example 20—The non-transitory computer readable storage medium of any of Examples 16-19, wherein the ROI information includes ROI boundaries with x coordinate, y coordinate edges, and channel entropy to indicate complexity of an object.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize.

These modifications may be made to the disclosure in light of the above detailed description. The terms used in the following claims should not be construed to limit the disclosure to the specific implementations disclosed in the specification and the claims. Rather, the scope of the disclosure is to be determined entirely by the following claims, which are to be construed in accordance with established doctrines of claim interpretation.

The invention claimed is:

1. A computer implemented method for using computer vision to guide processing of receive radio frequency (RF) responses of radio detection and ranging (RADAR) sensors of a vehicle in a driving environment, the computer implemented method comprising:
   receiving, with one or more receivers of RADAR sensors, environment receive RF responses;
   receiving region of interest (ROI) information including segments of a tentative set of ROIs with free space area boundaries from an image processor of an image processing chain for the computer vision;
   dynamically determining a number of polyphase filters based on a number of ROIs having dynamic scenes that are provided by the image processing chain; and
   adjusting parameters of the polyphase filters of a RADAR processing chain based on the ROI information.

2. The computer implemented method of claim 1, wherein adjusting parameters of the polyphase filters of the RADAR processing chain comprises adjusting filter weights, phase, and magnitude of the receive RF responses based on the ROI information.

3. The computer implemented method of claim 1, further comprising:
   down converting the receive RF responses and then digitizing the down converted RF responses into RF signals; and
   calculating a Range-Doppler map of the recorded RF signals.

4. The computer implemented method of claim 3, further comprising:
   calculating the Azimuth and elevation spectrum of the Range-Doppler map to determine a 1:1 correspondence in a frequency domain between x and y coordinates for the receive RF responses.

5. The computer implemented method of claim 4, further comprising:
   adaptively applying dynamic polyphase filters to the receive RF responses to eliminate undesired responses and to generate a sparse data set.

6. The computer implemented method of claim 5, further comprising:
   performing a maximum likelihood beamforming for the azimuth based on the azimuth spectrum behavior within the sparse data set; and
   performing a maximum likelihood beamforming for the elevation based on the elevation spectrum behavior within the sparse data set.

7. The computer implemented method of claim 6, further comprising:
   populating RADAR point cloud data without artifacts for the driving environment based on the maximum likelihood beamforming for the azimuth and elevation; and
   transferring the RADAR point cloud data into a perception stack of the vehicle.

8. The computer implemented method of claim 1, wherein the ROI information includes ROI boundaries with x coordinate, y coordinate edges, and channel entropy to indicate complexity of an object.

9. A computing system, comprising:
   a memory storing instructions; and
   a processor coupled to the memory, the processor is configured to execute instructions of a software program to:
      receive, with a RADAR processing chain, environment receive radio frequency (RF) responses that are based on electromagnetic (EM) waves in a radio domain originating from RADAR sensors of a vehicle;
      receive region of interest (ROI) information including segments of a tentative set of ROIs with free space area boundaries from an image processing chain;
      dynamically determine a number of polyphase filters of the RADAR processing chain based on a number of ROIs having dynamic scenes that are provided by the image processing chain; and
      adjust parameters of the polyphase filters of the RADAR processing chain based on the ROI information.

10. The computing system of claim 9, wherein adjusting parameters of the polyphase filters comprises adjusting filter weights, phase, and magnitude of the receive RF responses based on the ROI information.

11. The computing system of claim 9, wherein the processor is configured to execute instructions of the software program to:
   calculate the Azimuth and elevation spectrum of a Range-Doppler map to determine a 1:1 correspondence in a frequency domain between x and y coordinates for the receive RF responses.

12. The computing system of claim 11, wherein the processor is configured to execute instructions of the software program to:
   adaptively apply dynamic polyphase filters to the receive RF responses to eliminate undesired responses and to generate a sparse data set.

13. The computing system of claim 12, wherein the processor is configured to execute instructions of the software program to:
   perform a maximum likelihood beamforming for the azimuth based on the azimuth spectrum behavior within the sparse data set; and
   perform a maximum likelihood beamforming for the elevation based on the elevation spectrum behavior within the sparse data set.

14. The computing system of claim 13, wherein the processor is configured to execute instructions of the software program to:
   populate RADAR point cloud data based on the maximum likelihood beamforming for the azimuth and elevation; and
   transfer the point cloud data into a perception stack.

15. The computing system of claim 9, wherein the ROI information includes ROI boundaries with x coordinate, y coordinate edges, and channel entropy to indicate complexity of an object, wherein the vehicle comprises an autonomous vehicle.

16. A non-transitory computer readable storage medium having embodied thereon a program, wherein the program is executable by a processor to perform a method comprising:
   receiving, with a RADAR processing chain, environment receive radio frequency (RF) responses from RADAR sensors of a vehicle;
   receiving region of interest (ROI) information including segments of a tentative set of ROIs with free space area boundaries from an image processing chain;
   dynamically determining a number of polyphase filters based on a number of ROIs having dynamic scenes that are provided by the image processing chain; and
   adjusting parameters of the polyphase filters of the RADAR processing chain based on the ROI information.

17. The non-transitory computer readable storage medium of claim 16, the method further comprising:
- receiving a RADAR raw data cube along azimuth and elevation receiver channel directions for receivers of the RADAR sensors of the vehicle;
- applying one or more predetermined window functions to the RADAR raw data cube along the azimuth and elevation receiver channel directions of receiver channels; and
- calculating a Fast Fourier Transform both along the azimuth and elevation receiver channels.

18. The non-transitory computer readable storage medium of claim 17, the method further comprising:
- apply dynamic polyphase filters to the receive RF responses to eliminate undesired responses and to generate a sparse data set.

19. The non-transitory computer readable storage medium of claim 18, the method further comprising:
- perform a maximum likelihood beamforming for the azimuth based on the azimuth spectrum behavior within the sparse data set; and
- perform a maximum likelihood beamforming for the elevation based on the elevation spectrum behavior within the sparse data set.

20. The non-transitory computer readable storage medium of claim 16, wherein the ROI information includes ROI boundaries with x coordinate, y coordinate edges, and channel entropy to indicate complexity of an object, wherein the vehicle comprises an autonomous vehicle.

\* \* \* \* \*